(12) United States Patent
Ohira et al.

(10) Patent No.: US 7,431,114 B2
(45) Date of Patent: Oct. 7, 2008

(54) SYSTEM FOR ACCESSING AN AIR BOX IN A STRADDLE TYPE VEHICLE

(75) Inventors: Masaru Ohira, Shizuoka-ken (JP);
Yutaka Mine, Shizuoka-ken (JP);
Shigeru Matsusaka, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 255 days.

(21) Appl. No.: 11/284,793

(22) Filed: Nov. 22, 2005

(65) Prior Publication Data
US 2006/0124379 A1    Jun. 15, 2006

(30) Foreign Application Priority Data
Nov. 22, 2004    (JP)    ............... 2004-338066

(51) Int. Cl.
*B60K 7/00*    (2006.01)
(52) U.S. Cl. ..................... 180/68.3; 180/219
(58) Field of Classification Search ............... 180/68.1, 180/68.2, 68.3, 219, 229, 210
See application file for complete search history.

(56) References Cited

U.S. PATENT DOCUMENTS

| | | | |
|---|---|---|---|
| 6,615,945 B2 * | 9/2003 | Minami et al. .............. | 180/219 |
| 6,626,260 B2 * | 9/2003 | Gagnon et al. .............. | 180/291 |
| 6,732,830 B2 * | 5/2004 | Gagnon et al. .............. | 180/291 |
| 6,776,250 B2 * | 8/2004 | Kuji et al. .................. | 180/68.3 |
| 6,892,842 B2 * | 5/2005 | Bouffard et al. ........... | 180/68.3 |

FOREIGN PATENT DOCUMENTS

JP    59-077924    4/1984

* cited by examiner

*Primary Examiner*—Christopher Ellis
*Assistant Examiner*—Brian Swenson
(74) *Attorney, Agent, or Firm*—Knobbe, Martens Olson & Bear, LLP

(57) ABSTRACT

A system is provided that permits access to an air box in a straddle type vehicle (e.g., a motor scooter). The system comprises a movable seat that is capable of rotating such that a user can access the air box disposed at least partially beneath the seat. The air box comprise an air cleaner that has an air filter capable of being detached and pulled at least partially through an opening in an upper portion of the air cleaner. As a result, the air filter can be removed easily in order to be cleaned or replaced. The system can also include a fender which is capable of rotating about a generally horizontal axis.

21 Claims, 9 Drawing Sheets

SYSTEM FOR ACCESSING AN AIR BOX IN A STRADDLE TYPE VEHICLE

CROSS-REFERENCE TO RELATED APPLICATIONS

This application is based on and claims priority under 35 U.S.C. § 119(a)-(d) to Japanese Patent Application No. 2004-338066, filed Nov. 22, 2004, the entire content of which is hereby incorporated by reference.

BACKGROUND OF THE INVENTION

1. Field of the Invention

The present invention relates to straddle type vehicles in general and, in particular, to a straddle type vehicle having a movable seat and a vehicle body cover configured so as to permit access to an air box disposed at least partially within the vehicle body cover.

2. Description of the Related Art

Some straddle type vehicles (e.g., motor scooters) contain an engine having a combustion chamber in which a mixture of fuel and air is compressed and burned in order to produce mechanical work to operate the vehicle. An air induction system supplies air to the combustion chamber(s) of the engine. One component of the air induction system is commonly an air cleaner. The air cleaner receives incoming air, which passes through a filter in order to remove impurities and directs the filtered air to the engine where the air is mixed with fuel. It is desirable to provide filtered air to the engine so that impurities are removed before combustion so as to achieve a more efficient combustion process and to extend the operational life of the vehicle's engine.

Prior straddle type vehicles contain an air cleaner. The air cleaner typically is separated into two chambers and contains an air filter. A first chamber receives ambient, unfiltered air containing certain impurities (e.g., dirt, dust, etc.). The ambient air is directed through an air filter to a second chamber. The second chamber receives the clean, filtered air and directs the air to the engine.

A problem associated with prior air cleaners is that they are often difficult to access. Typically, the body cover of the straddle type vehicle covers the air cleaner so that it cannot be accessed without removing the vehicle body cover or a portion thereof (e.g., a side panel). In addition, components of the air cleaner, such as the air filter, are also often difficult to access. Typically, an upper portion of the air cleaner must at least partially be removed in order to remove the air filter so that it may be cleaned or replaced. Removing the upper portion of the air cleaner can be difficult and time consuming because this component is relatively large and difficult to access in many prior vehicle. In addition, the upper portion of the air cleaner can be damaged when it is removed.

SUMMARY OF THE INVENTION

In accordance with one aspect of the present invention, a straddle type vehicle comprises at least one wheel that rotates about a generally horizontal axis and a vehicle body supported in part by the wheel. A power train includes an engine supported at least in part by the vehicle body. The engine has at least an induction system for supplying air to a portion of the engine. The engine preferably is an internal combustion engine; however, other types of engines can also be used (e.g., a fuel cell). A vehicle body cover extends over a portion of the power train. In addition, the vehicle comprises a movable seat, which preferably is capable of rotating about a generally horizontal axis. An air box is located substantially within the vehicle body cover. The air box comprises a first portion, a second portion, a detachable air filter, an opening, and an air box cover that allows the opening in the air box to open and close.

Another aspect of the present invention involves a straddle type vehicle that comprises at least one wheel that rotates about a generally horizontal axis and a vehicle body that is supported in part by the wheel. The vehicle includes a power train with an engine supported at least in part by the vehicle body. The engine preferably is an internal combustion engine; however, other types of engines can also be used (e.g., a fuel cell). The engine powers the wheel and includes an induction system for supplying air to the engine. In addition, a vehicle body cover extends over at least a portion of the power train. A movable seat is disposed above at least a portion of the power train. At least a portion of an air box is disposed within the vehicle body cover. The vehicle also comprises a fender for covering an upper portion of the wheel, and a support member located at least partially on the air box to support a least a portion of the fender.

In accordance with an additional aspect of the present invention, a straddle type vehicle is provided comprising at least one wheel that rotates about a generally horizontal axis and a vehicle body supported in part by the wheel. The vehicle body includes a steering column and a steering mechanism coupled to a top portion of the steering column. A power train includes an engine supported at least in part by the vehicle body. The engine preferably is an internal combustion engine; however, other types of engines can also be used (e.g., a fuel cell). The engine includes an induction system for providing air to a portion of the engine. A vehicle body cover extends over at least a portion of the power train and a movable seat is located above the power train. An air box is disposed at least partially within the vehicle body cover.

In a preferred mode, the vehicle may comprise a second wheel. The second wheel is disposed on the vehicle behind the first wheel. The second wheel is arranged on the vehicle such that a front portion of the second wheel is located closer to a front end of the vehicle than is a rear portion of the air box.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following nine figures.

DETAILED DESCRIPTION OF THE PREFERRED EMBODIMENT

Figure 1:
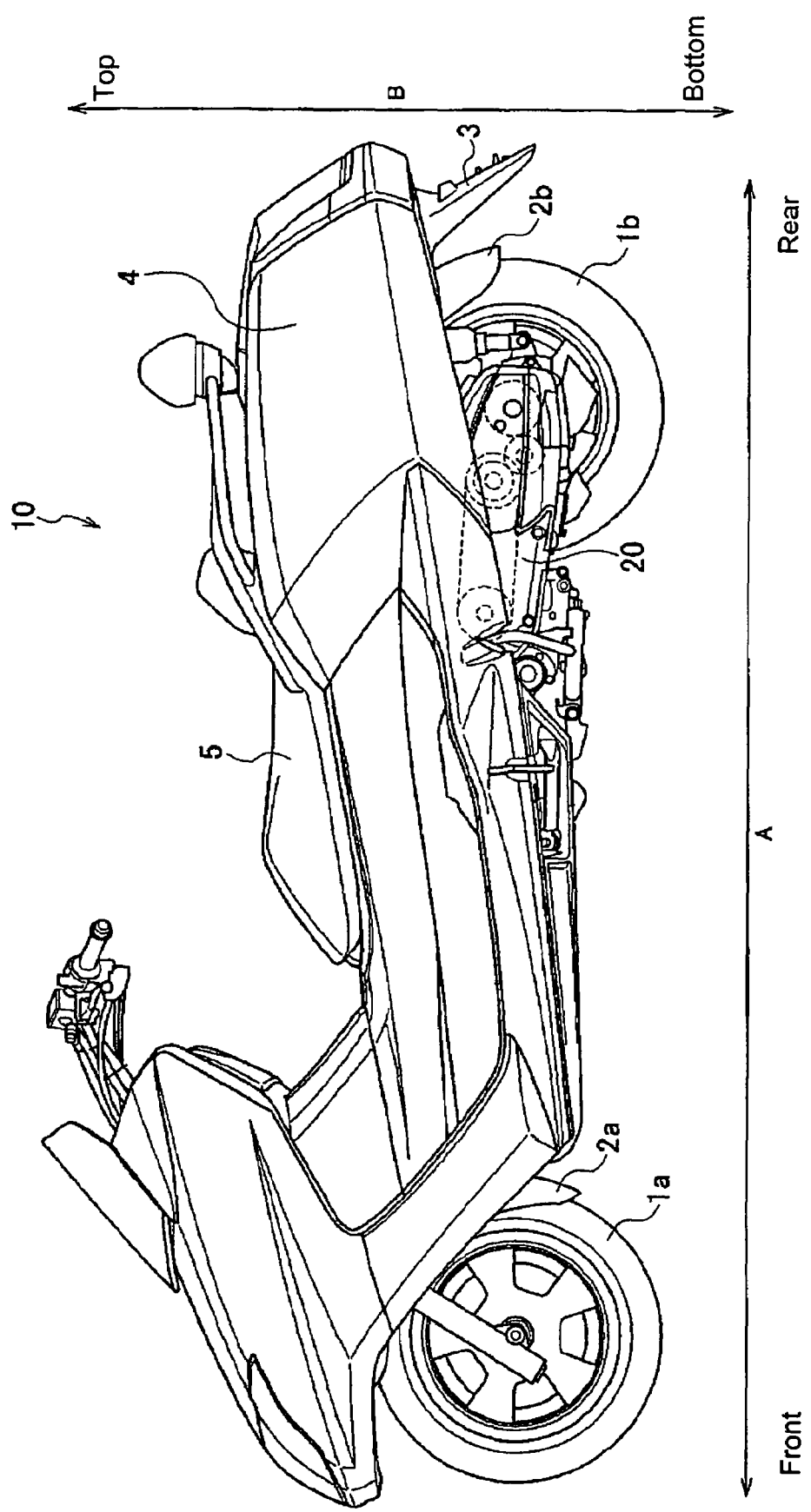
FIG. 1 is a side elevational view of a straddle type vehicle including a system for accessing an air box configured in accordance with a preferred embodiment of the present invention.

A system for accessing an air box is illustrated in the drawings and is described below in the context of an application with a straddle type vehicle. However, the system for accessing an air box can be used with other types of vehicles. Preferably, the system can be used with vehicles which have a wheel that rotates about a generally horizontal axis, a steering column, a steering mechanism coupled to the top of the steering column, and a straddle type seat located substantially near the steering column. For example, such vehicles in which the system described herein can be employed include, but are not limited to, a motorcycle, a scooter, and a multi-terrain vehicle. Accordingly, the below description and the drawings describe a motorized scooter; however, the present accessing system can be used on other types of straddle type vehicles as well.

The configuration of a motor scooter in an embodiment of the invention is described below in reference to the drawings. FIG. 1 is a side elevational view of a motor scooter 10 as seen in the transverse direction in an embodiment of the invention. Incidentally, the term fore-and-aft direction of the motor scooter 10 as used herein means the direction A as shown in FIG. 1, and the vertical direction of the motor scooter 10 means the direction B as shown in FIG. 1.

As shown in FIG. 1, the motor scooter 10 includes: wheels (the front wheel 1a and the rear wheel 1b) supported rotatably with wheel shafts, fenders (the fender 2a and the fender 2b) covering the wheels from above in the fore-and-aft direction, a mud guard 3 attached to the rear portion of the motor scooter 10 and covering from above the rear wheel 1b, a vehicle body cover 4 covering the vehicle body of the motor scooter 10 from outside in the transverse direction of the vehicle, a movable seat 5 for a driver to sit on, and a belt chamber 20 that accommodates a transmission belt for transmitting rotational power generated by the engine 40 (which is described below) to the rear wheel 1b.

In one embodiment, the motor scooter 10 is a tandem type of vehicle that a co-rider as well as the driver can ride. The vehicle body cover 4 is made by overlapping a plurality of parts and includes footboards for the rider and the co-rider to put their feet on.

Figure 2:
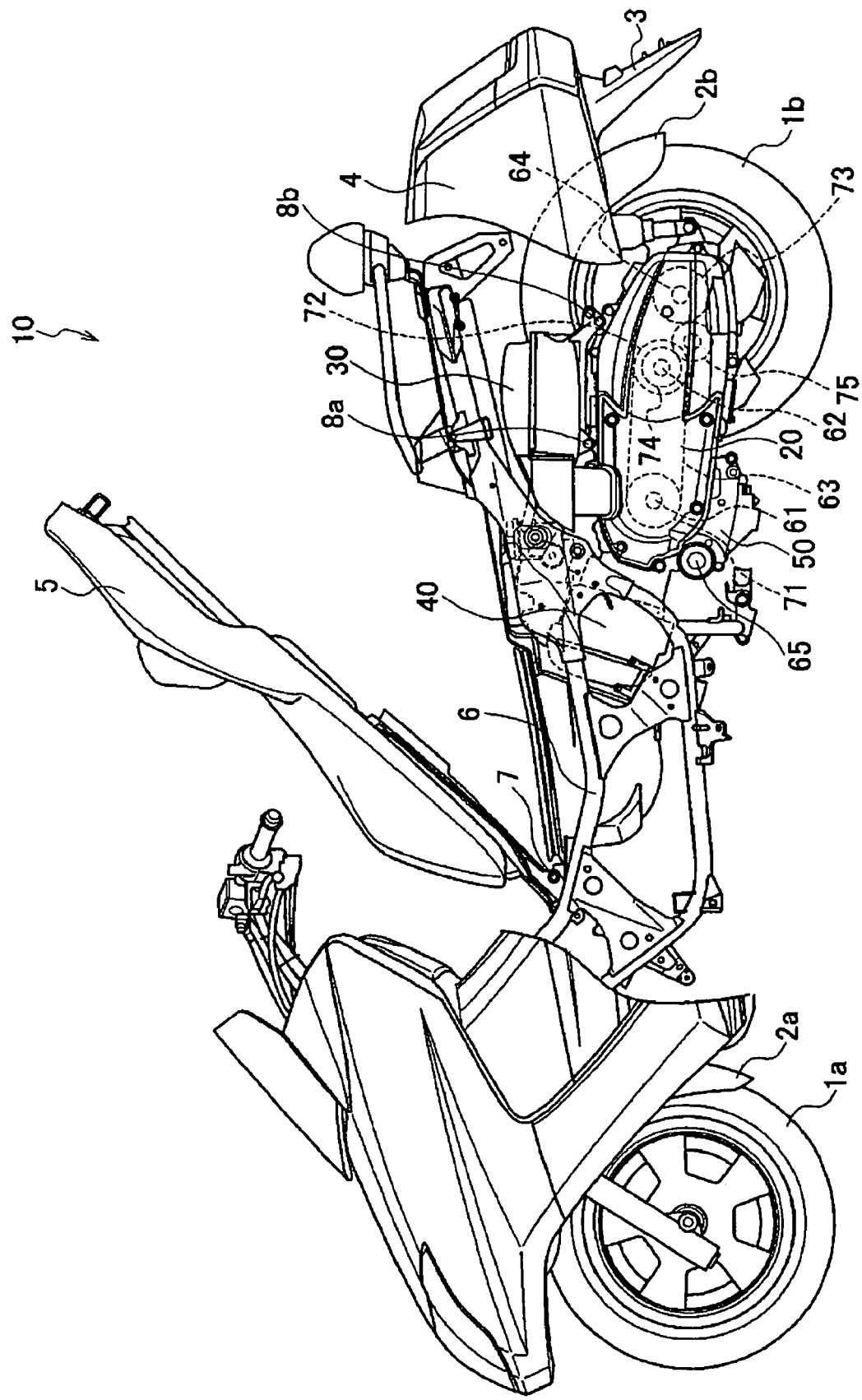
FIG. 2 is a side elevational view of the straddle type vehicle as shown in FIG. 1 showing a movable seat in an upright position and a portion of a vehicle body cover removed.

FIG. 2 is a side elevational view of the motor scooter 10 in an embodiment of the invention as seen from outside in the transverse direction of the vehicle, with part of the vehicle body cover 4 omitted. As shown in FIG. 2, the motor scooter 10 includes the vehicle body frame 6 forming the framework of the motor scooter 10. Various units constituting the motor scooter 10 are attached to the vehicle body frame 6.

In one embodiment, the movable seat 5, the belt chamber 20, the engine 40, the crankcase 50, and the like are attached to the vehicle body frame 6. The air cleaner 30 is secured to the belt chamber 20 by means of a screw 8a and a screw 8b. The movable seat 5 is disposed above the air cleaner 30 and attached to the vehicle body frame 6 for pivotal movement about a pivot axis (pivotal shaft 7) extending along the transverse direction of the vehicle and comprising a generally horizontal axis. In other words, the movable seat 5 is attached so as to define an open area above the air cleaner 30 as the movable seat 5 is pivoted about the pivot shaft 7. Further, the movable seat 5 is a tandem seat that the rider and the co-rider can sit on.

The belt chamber 20 is disposed on the transverse inner side of the vehicle body cover 4. The belt chamber 20 accommodates: a drive-side pulley 71 rotatably attached to a shaft 61, a driven-side pulley 72 rotatably attached to a shaft 62, a transmission belt 63 routed around the drive-side pulley 71 and the driven-side pulley 72, a wheel shaft-side gear 73 rotatably attached to the wheel shaft 64 of the rear wheel 1b, a driven-side gear 74 rotatably attached to the shaft 62, and an intermediate gear 75 meshing with the wheel shaft-side gear 73 and the driven-side gear 74. The rotational power generated by the engine 40 is transmitted from the drive-side pulley 71 to the driven-side pulley 72 through the transmission belt 63 and also through the driven-side gear 74, the intermediate gear 75, and the wheel shaft-side gear 73 to the rear wheel 1b.

In the illustrated embodiment, the air cleaner 30 is disposed at least partially below the movable seat 5. A holding case (not shown) attached removably to the vehicle body of the motor scooter 10 is disposed between the movable seat 5 and the air cleaner 30. Advantageously, the air cleaner 30 is placed in a position so that maintenance of the air cleaner 30 may be done from above when the movable seat 5 is pivoted about the pivot shaft 7 and at the same time the holding case is removed. The air cleaner. 30 is placed in a position above the belt chamber 20 and inside the vehicle body cover 4 in the transverse direction of the vehicle. Further, the air cleaner 30 removes impurities, such as dirt or gravel, from the air suctioned from outside the motor scooter 10. The filtered air is then suctioned into the engine 40 (and into the cylinder). Details of the air cleaner 30 are described below with reference to FIGS. 3 through 8.

The engine 40 preferably has at least one combustion chamber within a cylinder for taking in air free from impurities and fuel, which are mixed together, and a piston disposed within the cylinder. The engine 40 is constituted so that the piston reciprocates within the cylinder by repeating the following four steps: suction or intake of mixture, compression of mixture, combustion of mixture, and discharge of mixture after it is burned. In an alternative to supplying air and fuel through the induction system, air can be drawn into the combustion chamber during the intake stroke and fuel can be directly supplied to the chamber. Additionally, the engine can have any number of cylinders, can have any of a variety of cylinder arrangements, and can operate on other combustion principles (e.g., two-stroke, rotary, etc.). Furthermore, the engine need not be an internal combustion type engine.

A crankshaft is attached through a connecting rod to the piston. As the piston reciprocates within the cylinder, the crankshaft rotates within the crankcase 50. In other words, the engine 40 generates rotational power for rotating the rear wheel lb by causing the piston to reciprocate within the cylinder while causing the crankshaft to rotate within the crankcase 50. The crankcase 50 preferably accommodates the crankshaft and other components of the engine.

In the illustrated embodiment, the belt chamber 20, the engine 40, and the crankcase 50 constitute an engine unit that can swing about a pivot point 65 and is supported by the vehicle body frame 6. Further, the air cleaner 30 is at least partially attached to the engine unit (belt chamber 20) and is capable of swinging together with the engine unit.

Figure 3:
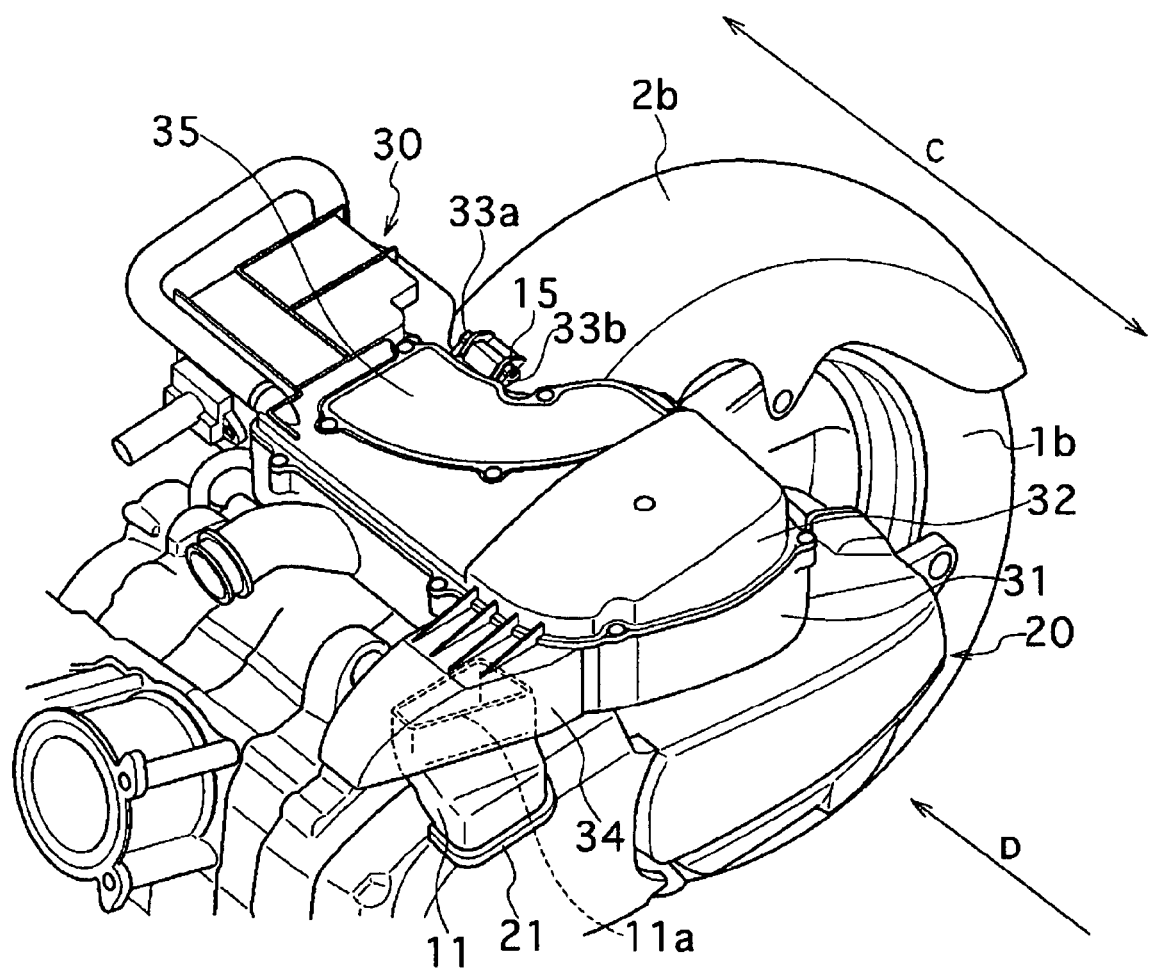
FIG. 3 is a perspective view of a rear portion of the vehicle showing an air box of the straddle type vehicle as shown in FIG. 1.

FIG. 3 is a perspective view showing the air cleaner 30 and the belt chamber 20 in one embodiment of the invention. In this embodiment, the transverse direction of the motor scooter 10 is the direction C as indicated in FIG. 3. As shown in FIG. 3, the belt chamber 20 is disposed at least partially below the air cleaner 30. The belt chamber 20 is also disposed further outside in the transverse direction of the vehicle than the rear wheel 1b.

The belt chamber 20 has an air suction port 21 for suctioning air from outside the motor scooter to cool the interior of the belt chamber 20. The air suction port 21 is provided in the front end portion of the belt chamber 20 in order to enhance cooling within the belt chamber 20. An air suction duct 11 is attached to the air suction port 21 and extends from the air suction port 21 toward the air cleaner 30.

In another embodiment, the air cleaner 30 is configured to extend in the transverse direction of the motor scooter 10, astraddle of the central portion (the rear wheel 1b and the fender 2b) of the motor scooter 10. Specifically, the length of the air cleaner 30 in the transverse direction (that is, side to side) of the motor scooter 10 is at least longer than the length of the air cleaner 30 in the fore-and-aft direction of the motor scooter 10 and the length of the air cleaner 30 in the vertical direction of the motor scooter 10. In order to secure sufficient capacity of the air cleaner 30, the length of the air cleaner 30 in the transverse direction of the motor scooter 10 is preferably longer than the length of the engine 40 in the transverse direction of the motor scooter 10.

The air cleaner 30 preferably is comprised of a lower unit 31 constituting the lower portion of the air cleaner 30 and an upper unit 32 constituting the upper portion of the air cleaner 30. The upper unit 32 is capable of being attached to and removed from the lower unit 31. In one embodiment, the air cleaner 30 is configured so as to be dividable in the vertical direction of the motor scooter 10.

The lower unit 31 has a pair of support portions (a support portion 33a and a support portion 33b) for supporting the fender 2b. Further, the support portion 33a and the support portion 33b support the fender 2b for pivotal movement about a pivot axis (pivot shaft 15) extending in the transverse direction of the motor scooter 10. Incidentally, the fender 2b may be attached to the support portion 33a and the support portion 33b and may be either at least partially fixed or removable.

The upper unit 32 has an umbrella portion 34 for covering the opening 11a of the air suction duct 11 disposed on the air cleaner 30 side from above the motor scooter 10, and an opening cover 35 for covering the opening (opening 32c) for taking out a filter (filter 14 to be described below with reference to FIGS. 4 and 5). The umbrella portion 34 is constituted to cover sidewise the opening 11a of the air suction duct 11 so as to prevent water from finding its way into the air suction duct 11 (and into the belt chamber 20). Further, the umbrella portion 34 may have a labyrinth structure to prevent water from finding its way into the air suction duct 11 (and into the belt chamber 20).

The present system preferably comprises the air cleaner 30, which is located under the movable seat 5 and which is principally formed by the lower unit 31 and the upper unit 32 that is removably attached to the lower unit 31. The movable seat 5 is attached to the vehicle body frame 6 (i.e., rotatably attached to the vehicle body frame 6) so that the area above the air cleaner 30 may be made open. Therefore, maintenance of the air cleaner 30 may be performed from above. In other words, since the vehicle body cover 4 need not be removed from the vehicle body of the motor scooter 10, and caution need not be exercised to prevent the projections or the like of the vehicle body cover 4 from being damaged by repeated removal and attachment of the vehicle body cover 4, it is easier to perform maintenance of the air cleaner 30.

Further, as the air cleaner 30 is shaped to extend astraddle of the rear wheel 1b in the transverse direction, it is possible to secure sufficient capacity of the air cleaner 30 and to minimize the height in the vertical direction of the motor scooter 10 corresponding to the part where the air cleaner 30 is provided.

Figure 4:
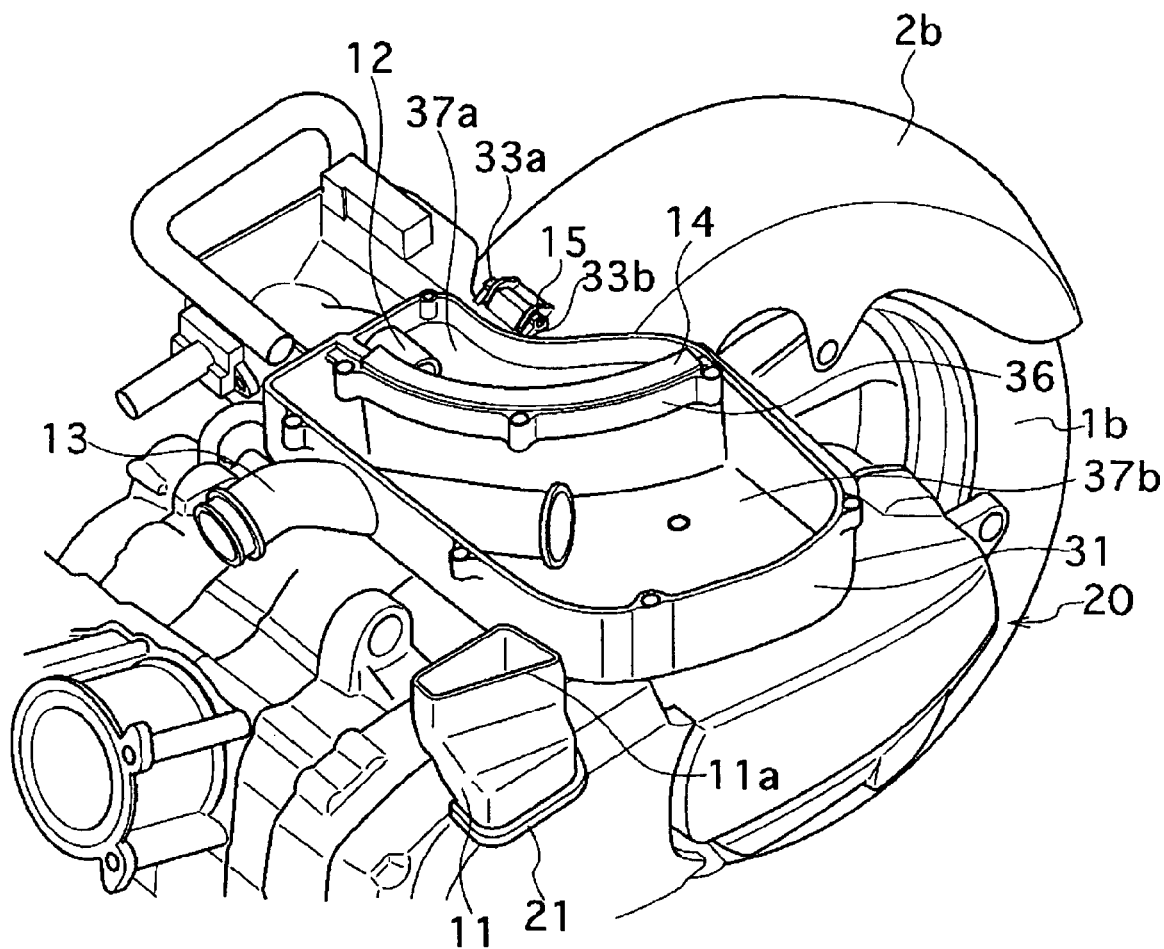
FIG. 4 is a perspective view of a rear portion of the vehicle showing the interior of the air box of the straddle type vehicle as shown in FIG. 3.

FIG. 4 is a perspective view of the air cleaner 30 and the belt chamber 20 in an embodiment of the invention. In FIG. 4, the upper unit 32 is removed. As shown in FIG. 4, the lower unit 31 comprises an attachment portion 36 adjacent to the filter 14 for removing impurities from air suctioned from outside the motor scooter 10, a dirty side portion 37a (e.g., a plenum chamber) which is a section from which impurities are yet to be removed with the filter 14, and a clean side portion 37b (e.g., a plenum chamber) which is a section from which impurities have been removed with the filter 14. The dirty side portion 37a and the clean side portion 37b are formed as the lower unit 31 and the upper unit 32 are combined.

A dirty side duct 12 for suctioning air from outside the motor scooter 10 is disposed in the dirty side portion 37a. A clean side duct 13 for supplying air with impurities removed through the filter 14 into the engine 40 (and into the cylinder) is disposed in the clean side portion 37b.

Figure 5:
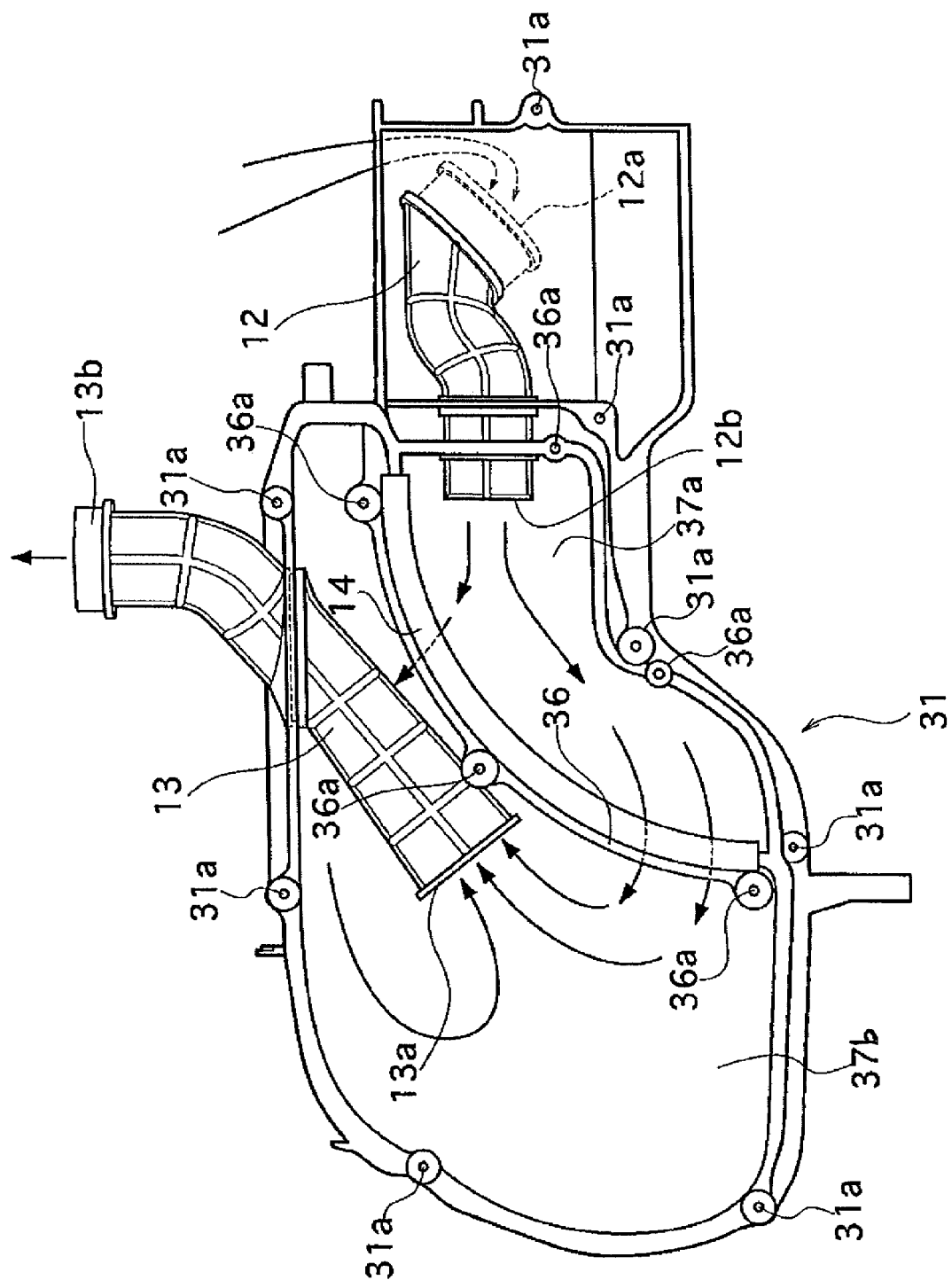
FIG. 5 is a top plan view of the interior of the air box of the straddle type vehicle as shown in FIG. 4.

FIG. 5 is a view of the lower unit 31 in one embodiment as seen from above. As shown in FIG. 5, the lower unit 31 is provided with a plurality of attachment holes 31a for attaching the upper unit 32 to the lower unit 31. Likewise, the attachment portion 36 provided on the lower unit 31 is provided with a plurality of attachment holes 36a for attaching the opening cover 35.

As shown in FIG. 5, air from outside the motor scooter 10 is suctioned through an opening 12a into the dirty side duct 12, through the dirty side duct 12 and through an opening 12b, into the dirty side portion 37a. The air in the dirty side portion 37a passes through the filter 14 and is suctioned into the clean side portion 37b. At this time, the filter 14 as described above removes impurities contained in the air in the dirty side portion 37a. The air in the clean side portion 37b is suctioned through an opening 13a into the clean side duct 13, through the clean side duct 13 and an opening 13b into the engine 40.

Figure 6:
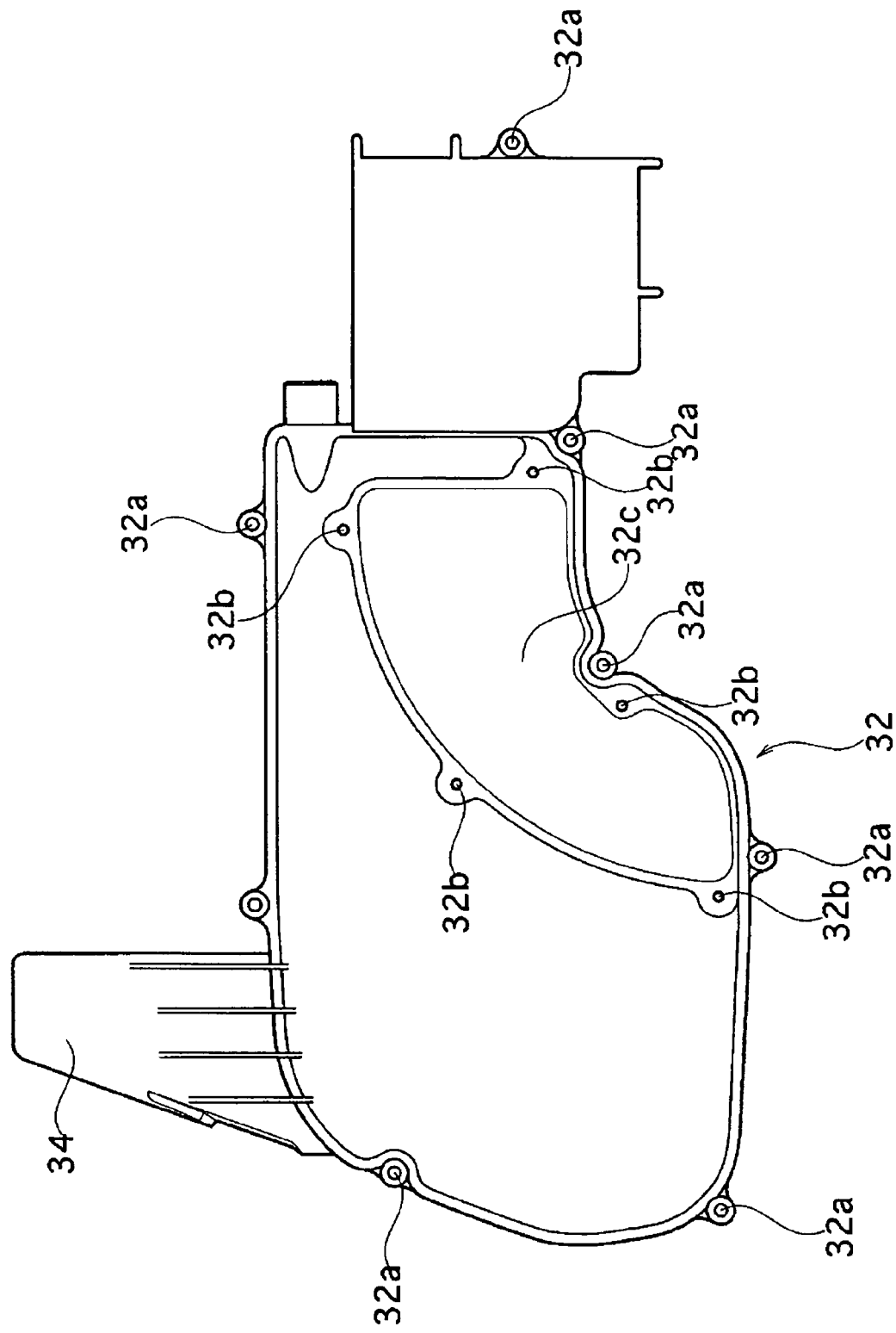
FIG. 6 is a top plan view of the air box of the straddle type vehicle as shown in FIG. 3.

FIG. 6 is a view of the upper unit in one embodiment as seen from above. In FIG. 6, the opening cover 35 is removed from the upper unit 32. As shown in FIG. 6, the upper unit 32 preferably is provided with a plurality of attachment holes 32a for attaching the upper unit 32 to the lower unit 31, and with a plurality of attachment holes 32b for attaching the opening cover 35 to the upper unit 32. The upper unit 32 defines an opening 32c at least partially disposed above the filter 14 and having a size that allows the filter 14 to be detached at least partially upward therethrough.

Advantageously, as the upper unit 32 defines the opening 32c having a size that allows the filter 14 to be detached upward therethrough, it is possible to take out the filter 14 through the opening 32c without dividing the air cleaner 30 into the lower unit 31 and the upper unit 32. As a result, maintenance of the filter 14 can be performed relatively easily.

Figure 7:
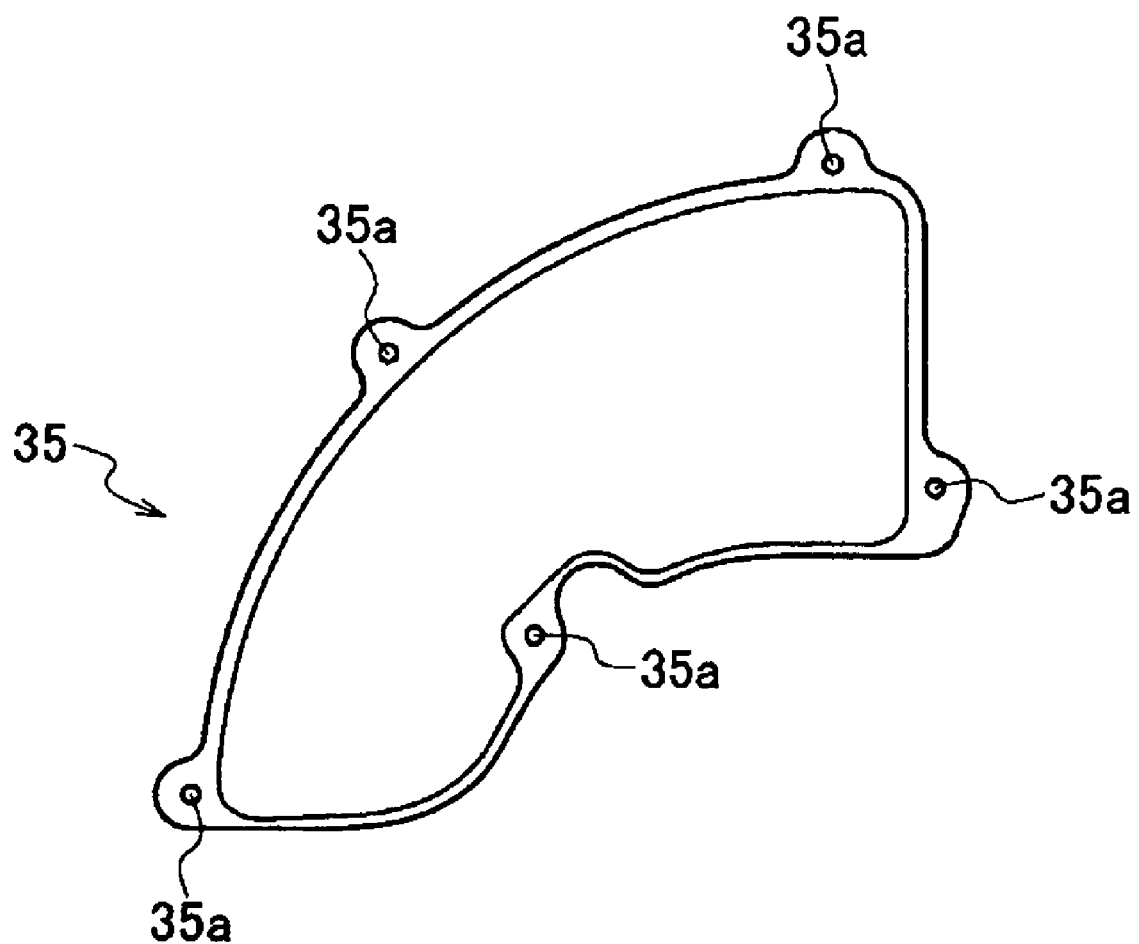
FIG. 7 is a top plan view of an air box cover disposed on the air box of the straddle type vehicle as shown in FIG. 6.

FIG. 7 is a view of the opening cover 35 in one embodiment as seen from above. As shown in FIG. 7, the opening cover 35 is provided with a plurality of attachment holes 35a for attaching the opening cover 35 to the upper unit 32.

As shown in FIGS. 5 through 7, the upper unit 32 preferably is removably attached to the lower unit 31 with screws inserted into the attachment holes 31a of the lower unit 31 and into the attachment holes 32a of the upper unit 32. Further, the opening cover 35 is attached to the upper unit 32 and to the lower unit 31 as screws are inserted into the attachment holes 36a in the attachment portion 36 provided on the lower unit 31, into the attachment holes 32b of the upper unit 32, and into the attachment holes 35a of the opening cover 35. Incidentally, the opening cover 35 may be attached only to the upper unit 32. Further, as the upper unit 32 has the opening cover 35 for covering the opening 32c, it is possible to prevent impurities from passing through the opening 32c into the air cleaner 30. While the cover 35 is illustrated as being attached by fasteners, it is understood that the cover can be attached in a manner that opens and closes with opening while remaining attached to the air box. For example, the cover can be hinged to the air box or slide relative to a portion of the air box to open and close the opening.

Figure 8:
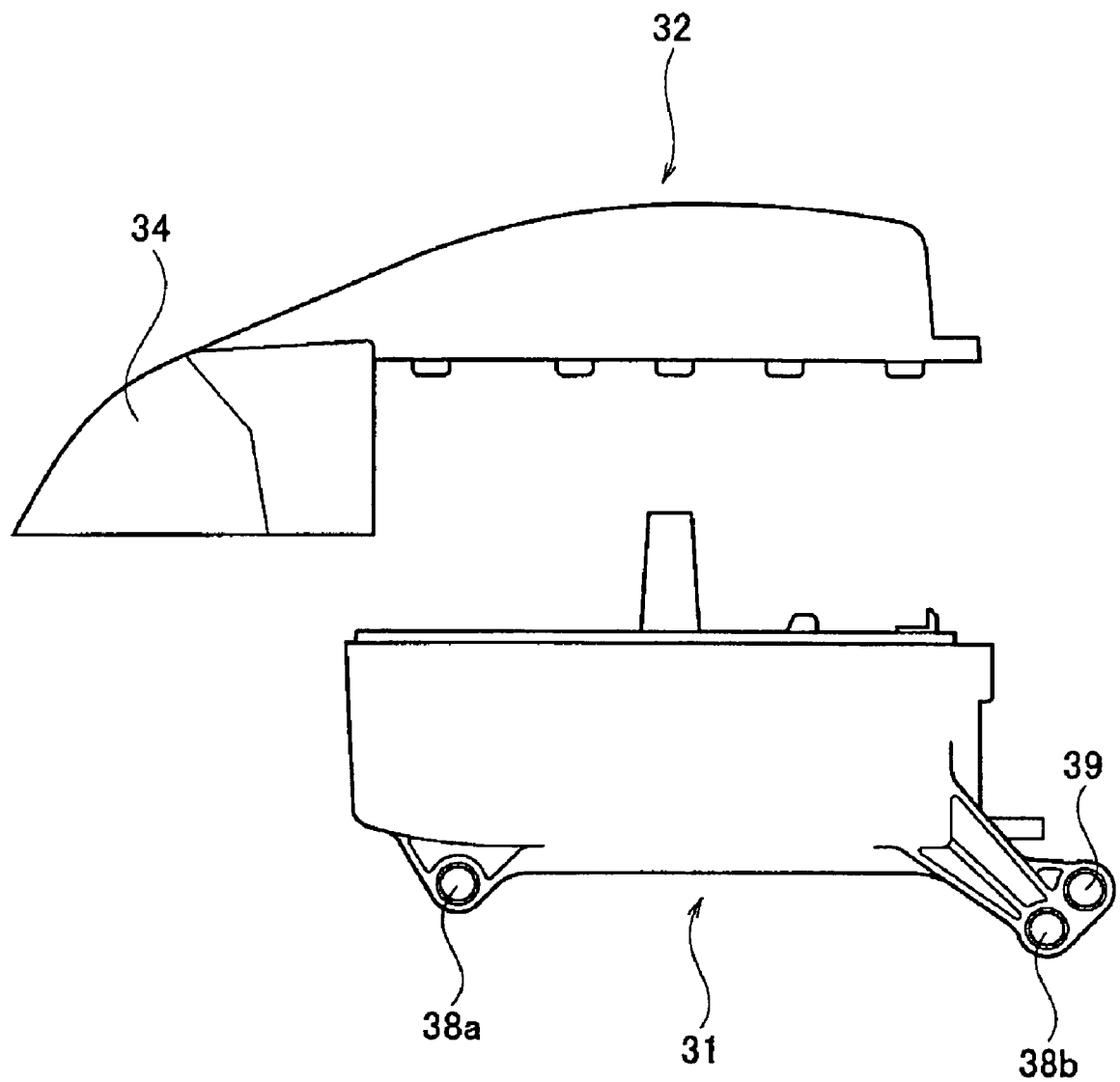
FIG. 8 is a side elevational view of a first portion and a second portion of the air box of the straddle type vehicle as shown in FIG. 1 showing the second portion detached from the first portion.

FIG. 8 is a view of the upper unit 32 and the lower unit 31 in an embodiment as seen in the direction D in FIG. 3. As shown in FIG. 8, the upper unit 32 preferably has, on its front side, an umbrella portion 34 for covering from above the air suction duct 11. The lower unit 31 has an attachment hole 38a and an attachment hole 38b for attaching the air cleaner 30 to the engine unit (belt chamber 20, not shown in FIG. 8). The lower unit 31 also has an attachment hole 39 for attaching a fender bracket (fender bracket 16 to be described later, to which the fender 2b is attached) to the lower unit 31. Thus, the air cleaner 30 is configured so as to be dividable into the upper unit 32 and the lower unit 31 in the vertical direction of the motor scooter 10.

Figure 9:
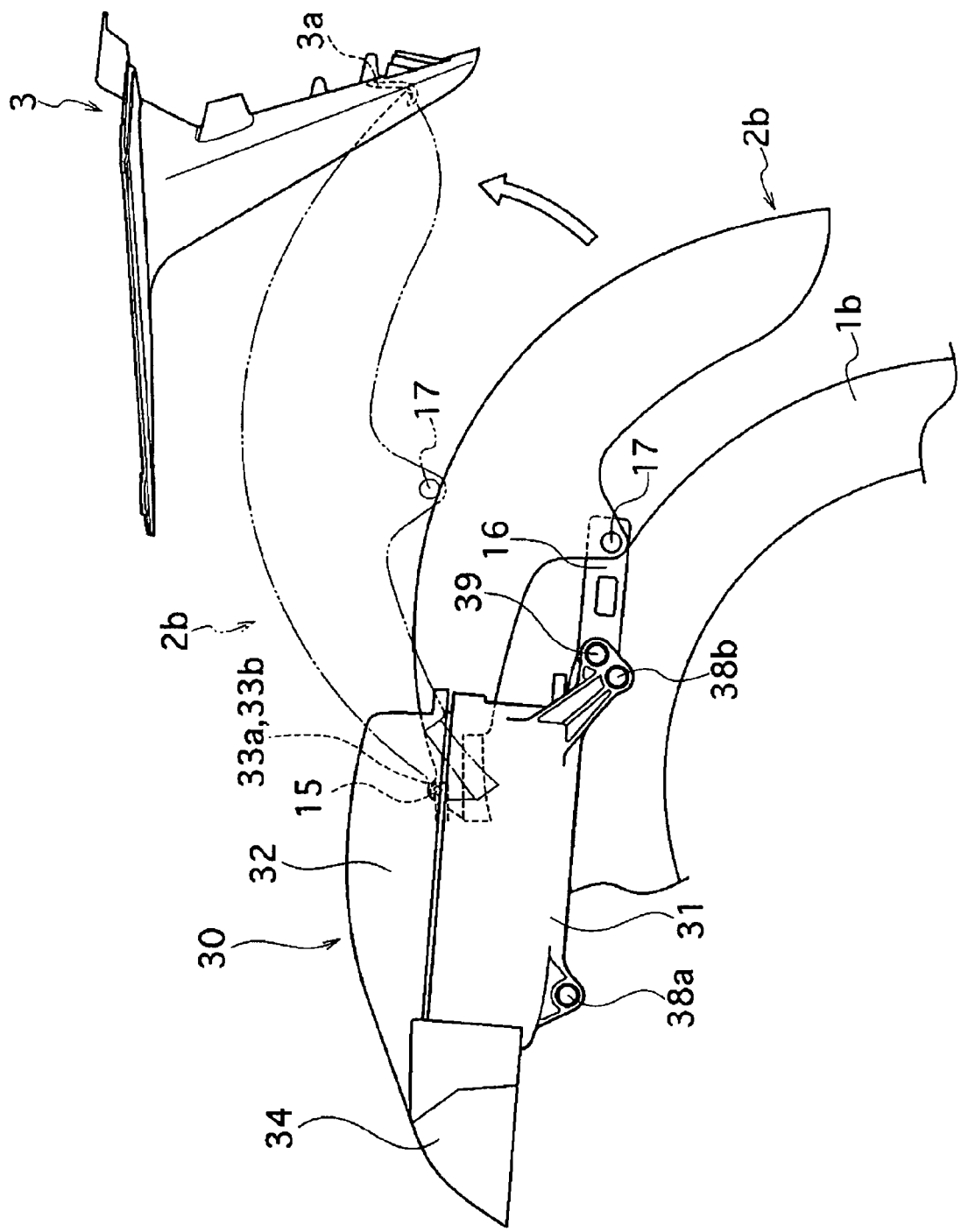
FIG. 9 is a side elevational view of a fender, a mud guard, and other components of the straddle type vehicle as shown in FIG. 1.

FIG. 9 is a view showing the layout of the fender 2b and the mud guard 3 in an embodiment of the vehicle. As shown in FIG. 9, a fender bracket 16 extending from the attachment hole 39 toward the rear of the motor scooter 10 is attached to the air cleaner 30 (lower unit 31) with a screw inserted into the attachment hole 39. The fender 2b also has an attachment hole 17 for attaching the fender 2b to the fender bracket 16, and is attached to the fender bracket 16 with a screw inserted into the attachment hole 17. Further, as described above, the fender 2b is supported with the support portion 33a and the support portion 33b of the lower unit 31 for pivotal movement about the pivot shaft 15.

In one embodiment, the mud guard 3 is attached to a trunk compartment (not shown) provided in the rear portion of the motor scooter 10. The mud guard 3 also has a lock portion 3a for locking the fender 2b as the fender 2b pivots about the pivot shaft 15. In other words, the fender 2b may be removed from the fender bracket 16 and locked with the lock portion 3a of the mud guard 3 as the fender 2b pivots about the pivot shaft 15.

In another embodiment, the movable seat 5 is attached, for pivotal movement about the pivot shaft 7, to the vehicle body (vehicle body frame 6) of the motor scooter 10, although this is not a limitation. The movable seat 5 may be removably attached to the vehicle body of the motor scooter 10 by tightening with screws or the like.

Further, as the air cleaner 30 has, in the lower portion of the air cleaner 30, the support portion 33a and the support portion 33b for supporting the fender 2b, an additional mechanism for supporting the fender 2b is not necessary. Therefore, the number of parts in the motor scooter 10 can be reduced. Further, as the fender 2b pivots about the pivot shaft 15, and is locked with the lock portion 3a of the mud guard 3, maintenance of the rear wheel 1b can be easily performed.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle type vehicle comprising:
at least one wheel that rotates about a generally horizontal axis;
a vehicle body supported at least in part by the wheel;
a power train including an engine supported at least in part by the vehicle body, wherein the engine includes at least an induction system for supplying air to at least a portion of the engine;
a vehicle body cover extending over at least a portion of the power train;
a movable seat positioned above at least a portion of the power train;
an air box disposed at least substantially within the vehicle body cover, the air box including a first portion and a second portion coupled together such that at least a part of the first portion of the air box is directly attached to at least a part of the second portion of the air box, an opening into the air box, and an air box cover that allows the opening in the air box to open and close; and
a detachable air filter disposed at least partially within the air box.

2. The straddle type vehicle of claim 1, wherein the air box comprises at least one plenum chamber.

3. The straddle type vehicle of claim 1, wherein the movable seat is capable of rotating about an axis that is at least generally parallel to the horizontal axis.

4. The straddle type vehicle of claim 1, wherein at least one hinge couples the moveable seat to the vehicle.

5. The straddle type vehicle of claim 1, wherein the movable seat is configured relative to the vehicle body cover such that a user can access the air box within the vehicle body cover by rotating the movable seat.

6. The straddle type vehicle of claim 1, wherein the first portion of the air box comprises a lower unit and the second portion of the air box comprises an upper unit such that the upper unit is capable of being connected to and detached from the lower unit.

7. The straddle type vehicle of claim 6, wherein the opening is disposed at least partially though the upper unit.

8. The straddle type vehicle of claim 7, wherein the opening is disposed at least partially above the detachable air filter such that the air filter is capable of being inserted and removed from the air box through the opening.

9. A straddle type vehicle comprising:
at least one wheel that rotates about a generally horizontal axis;
a vehicle body supported at least in part by the wheel;
a power train including an engine supported at least in part by the vehicle body, wherein the engine includes at least an induction system for supplying air to at least a portion of the engine, the engine powering said at least one wheel;

a vehicle body cover extending over at least a portion of the power train;

a movable seat positioned above at least a portion of the power train;

an air box disposed substantially within the vehicle body cover;

a fender at least partially covering an upper portion of said at least one wheel;

a locking member capable of fixing the fender to a rear portion of the straddle type vehicle; and a support member located at least partially on the air box to support at least part of the fender, wherein the fender and the support member are rotatably coupled together so as to permit the fender to rotate about a generally horizontal axis.

10. The straddle type vehicle of claim 9, wherein at least a portion of the air box is disposed to the side of the wheel, in a direction generally parallel to the generally horizontal axis.

11. The straddle type vehicle of claim 9 additionally comprising a mud guard located at least partially above a portion of the fender.

12. The straddle type vehicle of claim 9, wherein the movable seat is capable of rotating about a generally horizontal axis.

13. The straddle type vehicle of claim 9, wherein the air box comprises a first portion and a second portion, the first portion includes an opening and a cover closing the opening, and a filter element that is disposed within the air box and is accessible through the opening.

14. A straddle type vehicle comprising:
a vehicle body comprising a steering column, and a steering mechanism coupled to a top portion of the steering column;

a front wheel that rotates about a generally horizontal axis, the wheel being coupled to the steering column;

a power train including an engine supported at least in part by the vehicle body, wherein the engine includes at least an induction system for supplying air to at least a portion of the engine;

a vehicle body cover extending over at least a portion of the power train;

a movable seat positioned above at least a portion of the power train; and an air box disposed substantially within the vehicle body cover, wherein the air box comprises a first portion and a second portion, the first portion comprising an opening and a cover to removably close the opening, and a filter element disposed within the air box, at least the filter element being accessible through the opening.

15. The straddle type vehicle of claim 14 additionally comprising a rear wheel rotating about a second generally horizontal axis, the rear wheel being disposed on the vehicle such that a distance between a front portion of the rear wheel and a front end of the vehicle is less than the distance between a rear portion of the air box and the front end of the vehicle.

16. The straddle type vehicle of claim 14, wherein the first portion of the air box comprises a lower unit and the second portion of the air box comprises an upper unit, and the upper unit is capable of being connected to and detached from the lower unit.

17. The straddle type vehicle of claim 14, wherein the movable seat is capable of rotating about a generally horizontal axis.

18. The straddle type vehicle of claim 17, wherein at least one hinge couples the movable seat to the vehicle.

19. The straddle type vehicle of claim 14, wherein the movable seat is configured relative to the vehicle body cover such that a user can access the air box by rotating the movable seat.

20. A straddle type vehicle comprising:
at least one wheel that rotates about a generally horizontal axis;

a vehicle body supported at least in part by the wheel;

a power train including an engine supported at least in part by the vehicle body, wherein the engine includes at least an induction system for supplying air to at least a portion of the engine;

a vehicle body cover extending over at least a portion of the power train;

a movable seat positioned above at least a portion of the power train;

an air box disposed at least substantially within the vehicle body cover, the air box including a first portion comprising an upper unit and a second portion comprising a lower unit such that the upper unit is detachably coupleable to the lower unit, the air box having an opening disposed at least partially through the upper unit, and an air box cover that allows the opening in the air box to open and close; and a detachable air filter disposed at least partially within the air box.

21. A straddle type vehicle comprising:
at least one wheel that rotates about a generally horizontal axis;

a vehicle body supported at least in part by the wheel;

a power train including an engine supported at least in part by the vehicle body, wherein the engine includes at least an induction system for supplying air to at least a portion of the engine, the engine powering said at least one wheel;

a vehicle body cover extending over at least a portion of the power train;

a movable seat positioned above at least a portion of the power train;

an air box disposed substantially within the vehicle body cover, the air box comprising a first portion and a second portion, the first portion comprising an opening and a cover that removably closes the opening, and a filter element disposed within the air box, at least the filter being accessible through the opening;

a fender at least partially covering an upper portion of said at least one wheel; and a support member located at least partially on the air box to support at least part of the fender.

* * * * *

UNITED STATES PATENT AND TRADEMARK OFFICE
CERTIFICATE OF CORRECTION

PATENT NO. : 7,431,114 B2 Page 1 of 1
APPLICATION NO. : 11/284793
DATED : October 7, 2008
INVENTOR(S) : Ohira et al.

It is certified that error appears in the above-identified patent and that said Letters Patent is hereby corrected as shown below:

Title Page;
At page 1, item (74) attorney, please delete "Martens" and insert therefore, --Martens,--.

At column 4, line 29, please delete "cleaner." and insert therefore, --cleaner--.

At column 7, line 67, please delete "thereof" and insert therefore, --thereof.--.

At column 8, line 56 (approx.), in Claim 7, please delete "though" and insert therefore, --through--.

Signed and Sealed this

Twenty-first Day of April, 2009

JOHN DOLL
*Acting Director of the United States Patent and Trademark Office*